Feb. 18, 1969

R. S. GUMUCIO 3,428,529

SOLAR DISTILLATION OF FOAMED SALINE
WATER TO RECOVER FRESH WATER

Filed July 18, 1966

INVENTOR
Ricardo Salcedo
Gumucio
BY
Michael J. Anker
ATTORNEY

United States Patent Office 3,428,529
Patented Feb. 18, 1969

3,428,529
SOLAR DISTILLATION OF FOAMED SALINE
WATER TO RECOVER FRESH WATER
Ricardo Salcedo Gumucio, Madrid, Spain, assignor to Instituto Nacional de Industria, Madrid, Spain
Filed July 18, 1966, Ser. No. 565,780
Claims priority, application Spain, July 17, 1965, 315,400
U.S. Cl. 203—10    10 Claims
Int. Cl. C02b 1/06, 5/06; B01d 3/34

ABSTRACT OF THE DISCLOSURE

A distilling method which comprises the steps of converting a liquid to be distilled into a foam, and subjecting the thus formed foam to solar heat so as to evaporate at least a substantial portion of said foam; and a distilling device for distilling a liquid by utilizing solar heat, which comprises foam forming means for converting a liquid into a foam, solar distilling means for exposing the thus formed foam to solar heat so as to vaporize at least a portion of the liquid of said foam, condensing means operatively associated with said solar distilling means for condensing the vaporized portion of said liquid, and conduit means for passing foam from said foam forming means to said solar distilling means.

---

Figure 1:
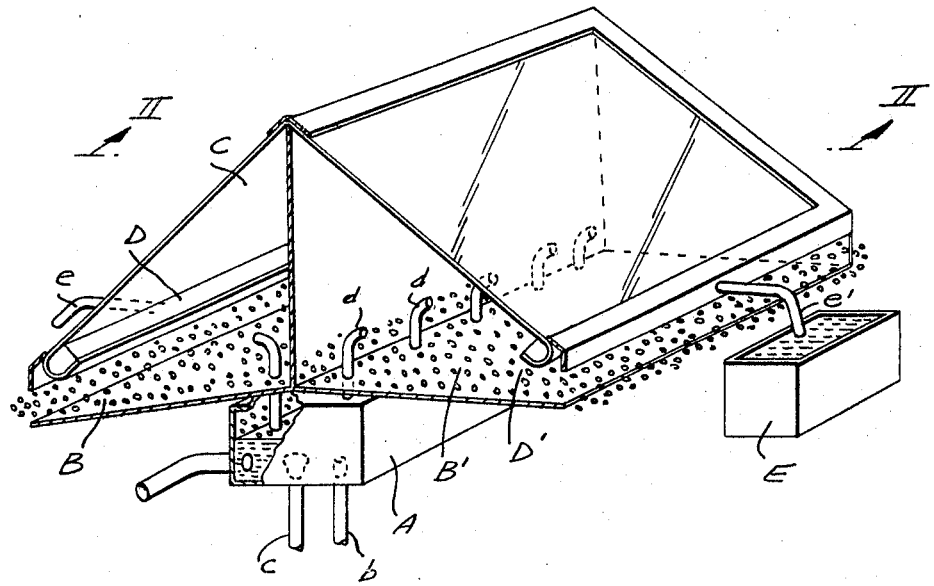

The present invention relates to a distilling method and device and, more particularly, the present invention is concerned with distilling liquids such as sea water or aqueous salt solutions by utilizing solar heat as the source of energy for evaporating the liquid.

The importance of industrial processes for converting saline water and sea water into fresh water is well known.

These processes may be classified as thermal processes or as electrical processes. The most important thermal processes are those that use high efficiency evaporation of saline water or the like, for instance by multistage distillation, the thermal compression process, instantaneous evaporation, etc. It has also been proposed to purify saline water and the like by cryoscopic or freezing processes.

The electrical processes include those in which electrodialysis is applied and, more recently, electrodialysis through ion exchange membranes. However, these processes are suitable only when the salt content of the water is below a certain limit and thus they cannot be used directly for desalting sea water.

Present efforts are frequently aimed towards improving saline water evaporation by better heat exchange between the heat source and the water which is to be evaporated, as well as by considerably increasing the evaporation surface. In addition, it is generally necessary to provide a system or process for the recovery of at least a part of the condensation heat, in order to obtain adequate efficiency with respect to the utilization of energy.

One of the more modern processes which is carried out "without boiling" is the rapid distillation process according to which the water to be treated is distributed over a large hot surface by centrifugal force so that a liquid film is formed which is in very close contact with the heated surface. In this way, an efficient thermal exchange and practically instantaneous evaporation are achieved and the formation of saline crusts on the heat exchange surface, which tend to insulate the liquid from the heat source, are minimized.

However, all of the known processes of saline water distillation are connected with serious problems with respect to corrosion, salt occlusion, crust formation, etc., the latter producing insulating layers on the heat exchange or evaporation surfaces. Upon prolonged use of the devices, such layers prevent efficient thermal exchange and thus the efficiency and useful lifespan of the installations are reduced unless descaling methods are applied. These methods are more or less expensive and complicated and increase the cost of producing for instance fresh water from saline or sea water.

It is therefore an object of the present invention to overcome the above-discussed difficulties and disadvantages.

It is a further object of the present invention to provide a method and device for the distillation of liquids, particularly aqueous salt solutions and sea water, which method can be carried out in a relatively simple and effective manner and which device is also relatively simple and inexpensive.

Other objects and advantages of the present invention will become apparent from a further reading of the description and of the appended claims.

With the above and other objects in view, the present invention contemplates a distilling method, comprising the steps of converting a liquid to be distilled into a foam, and subjecting the thus formed foam to solar heat so as to evaporate at least a substantial portion of the foam.

The present invention is also concerned with a distilling device for distilling a liquid under utilization of solar heat, comprising, in combination, foam forming means for converting a liquid into a foam, solar distilling means for exposing the thus formed foam to solar heat so as to vaporize at least a portion of the liquid of the foam, condensing means operatively associated with the solar distilling means for condensing the vaporized portion of the liquid, and conduit means for passing foam from the foam forming means to the solar distilling means.

Thus, according to the present invention, the above-discussed difficulties and disadvantages of prior art methods are overcome and rapid evaporation is achieved with an optimum energy exchange between the solar heat and the saline water or the like and, at the same time the formation of scales or crusts is avoided.

According to the present invention, the saline water or the the like prior to being distilled is converted into a foam or a more or less colloidal dispersion which is produced by adding a conventional detergent or foaming agent to the liquid and then passing a gas such as hot or compressed air or another suitable gas through the same so as to convert the liquid into a foam, and the thus formed foam is then exposed to solar heat.

According to another embodiment of the present invention, instead of blowing gas into the detergent-containing liquid, the latter is stirred and thereby converted into a foam. It is of course also possible to combine stirring and gas introduction.

It will be easily understood that the distribution of the water which is to be distilled throughout the very large surfaces represented by stable foam, and the very thin layers of liquid formed thereby will considerably facilitate evaporation. In addition, the solid residues which will be formed during evaporation, i.e. the salt content of the original liquid, will be finely divided and no scale formation or the like will take place.

Thus, the present invention will achieve a large evaporation surface and a very thin film of saline water which is subjected to evaporation under the influence of solar heat, which film is so thin that it may be passed through by solar infrared radiation.

Figure 2:
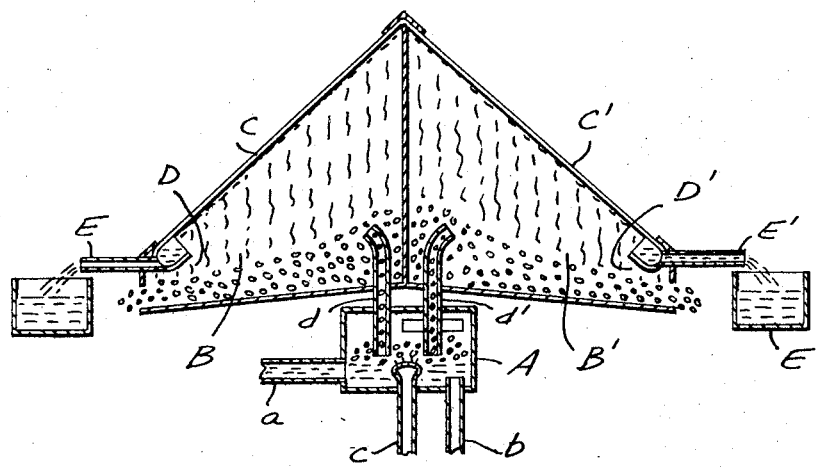

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 1 is a perspective view, partially in cross section of a solar heat foam distilling device according to the present invention; and FIG. 2 is a cross-sectional view through the device illustrated in FIG. 1 taken along the line II—II.

The present invention will now be described by way of example and with reference to the drawing, however, without limiting the invention to the specific details of the exemplary description.

FIG. 1 shows the entire distilling device and FIG. 2 is a cross section therethrough taken in a direction from east to west, in other words, the inclined surfaces C and C′ face east and west, respectively, so as to obtain maximum exposure to solar radiation.

A represents a sea water container to which sea water is fed through tube $a$. A dissolved detergent is introduced through tube $b$ in an amount such that the detergent concentration in the sea water container A will remain substantially constant. Only very small and economically insignificant amounts of conventional detergents are needed for operation of the device.

Foaming is carried out by introducing through conduit $c$, terminating in a nozzle head, a suitable gas such as compressed air into the liquid located in container A. Introduction of the compressed air or the like will cause foam formation of the detergent-containing liquid and a stable foam will be produced which passes through conduit $d$ and overflows from there onto the surfaces B of the distilling device, whereon the foam is exposed to solar heat radiation passing through transparent inclined surfaces C and C′, thereby causing evaporation of the thin liquid films forming the individual foam bubbles. The thereby obtained vapors condense into troughs D and D′ and flow from there through conduits E and E′ into collecting devices such as tanks E.

It is well known that foam is a dispersion of a gas in a liquid and thus formation of a foam represents a way of increasing the boundary surface between liquid and gas. In the present case, the gas preferably is air so that, if the foam represents a fine dispersion of quasi-colloidal type, the active evaporation surface per unit of volume is increased to an extremely large extent.

Since the evaporation surface in a conventional solar distiller depends on the surface area of the liquid film which is subjected to solar radiation, generally the larger the installation the greater the amount of vapors which can be produced in a given period of time.

On the other hand, when, in accordance with the present invention, a saline foam is exposed to solar radiation, the active evaporation surface depends only on the extent of air dispersion in the liquid, and thus the geometrical surface of the entire installation can be and will be considerably smaller than the actual surface of the liquid film of the dispersion which is subjected to solar heat.

For these reasons, the present invention permits the use of relatively very small solar distilling installations and the efficiency of these devices is signficantly increased by evaporating the saline foam, instead of a layer or continuous film of saline water which is directly supported by a surface portion of the distilling device.

In addition, the depth of penetration of solar rays is considerably greater in a foam than in a non-foamed saline liquid, this again may be primarily due to the very small thickness of the foam bubbles-forming films, and thus the evaporation is accelerated and the efficiency of the operation is increased.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for recovering solvent from a solution comprising a solvent and a solute, comprising the steps of admixing to said solution a foaming agent in a quantity sufficient to cause foaming of said solution upon agitation thereof; agitating in the presence of a gaseous medium the thus formed foaming-agent-containing solution so as to cause foaming of the latter; subjecting the thus formed foam to solar heat so as to cause evaporation of at least a substantial portion of the solvent constituent of said foam; separating the thus formed solvent vapors; and condensing the thus separated solvent vapors.

2. A method as defined in claim 1, and including the step of condensing said solvent vapors.

3. A method as defined in claim 1, wherein said solution is an aqueous salt solution.

4. A method as defined in claim 3, wherein said solution is sea water.

5. A method as defined in claim 1, wherein said agitating of said foaming-agent-containing solution is carried out by blowing a gas therethrough.

6. A method as defined in claim 5, wherein said gas is compressed air.

7. A method as defined in claim 1, wherein said agitating of said foaming-agent-containing solution is carried out by stirring.

8. A distilling device for distilling a foamable solution including a solvent and a solute by utilizing solar heat, said device comprising, in combination, foam-forming means including means for agitating in the presence of a gaseous medium said foamable solution so as to convert at least a portion of the solution into a foam; solar distilling means for exposing the thus formed foam to solar heat so as to vaporize at least a portion of the solvent constituent of said foam; condensing means for condensing the vaporized portion of said solvent; and conduit means for passing foam from said foam-forming means to said solar distilling means.

9. A distilling device as defined in claim 8, wherein said foam forming means comprise a vessel adapted to hold solution to be distilled; introducing means for introducing solution into said vessel so as to fill the same up to a predetermined level; and gas introducing means for introducing gas into said vessel at a point below said predetermined level.

10. A distilling device as defined in claim 8, wherein said foam forming means comprise a vessel adapted to hold solution to be distilled; introducing means for introducing solution into said vessel so as to fill the same up to a predetermined level; and stirring means for stirring said solution so as to foam the same.

References Cited

UNITED STATES PATENTS

| 863,031 | 8/1907 | Lehnert. | |
| 1,753,429 | 4/1930 | Rice | 252—359.5 X |
| 2,027,115 | 1/1936 | Oman et al. | 203—20 X |
| 2,616,839 | 11/1952 | Ames | 202—187 |
| 2,782,162 | 2/1957 | Liddell | 203—20 X |
| 2,981,629 | 4/1961 | Ginnette et al. | |
| 3,282,327 | 11/1966 | Hardy et al. | 159—1 X |

FOREIGN PATENTS 1,336,794  7/1963  France.

NORMAN YUDKOFF, *Primary Examiner.*

F. E. DRUMMOND, *Assistant Examiner.*

U.S. Cl. X.R.

159—1; 202—234; 203—50